US005886724A

United States Patent [19]
Kuwabara et al.

[11] Patent Number: 5,886,724
[45] Date of Patent: Mar. 23, 1999

[54] METHOD AND APPARATUS FOR THERMAL RECORDING

[75] Inventors: Takao Kuwabara; Tetsuya Kojima; Toshitaka Agano, all of Kanagawa, Japan

[73] Assignee: Fuji Photo Film Co., Ltd., Kanagawa, Japan

[21] Appl. No.: 831,524

[22] Filed: Apr. 1, 1997

[30] Foreign Application Priority Data

Apr. 1, 1996 [JP] Japan .................................. 8-078706

[51] Int. Cl.$^{6}$ .................................................. G01D 15/10

[52] U.S. Cl. .................. 347/188; 347/183; 400/120.09; 358/461

[58] Field of Search .................................. 347/183, 184, 347/188, 195; 400/120.09, 120.15; 358/298, 455, 456, 461

[56] References Cited

U.S. PATENT DOCUMENTS

| | | | |
|---|---|---|---|
| 4,774,528 | 9/1988 | Kato | 347/183 |
| 4,801,948 | 1/1989 | Kato | 347/184 |
| 5,142,302 | 8/1992 | Kano | 347/172 |
| 5,172,989 | 12/1992 | Imaseki et al. | 400/641 |
| 5,237,431 | 8/1993 | Imoto | 358/445 |
| 5,343,231 | 8/1994 | Suzuki | 347/14 |
| 5,608,333 | 3/1997 | Hayashi | 324/711 |
| 5,629,731 | 5/1997 | Kwon | 347/211 |
| 5,657,071 | 8/1997 | Shinohara | 347/252 |

FOREIGN PATENT DOCUMENTS

| | | |
|---|---|---|
| 8-25035 | 2/1996 | Japan . |
| 8-25036 | 2/1996 | Japan . |
| 9-50295 | 3/1997 | Japan . |
| 8-178129 | 7/1997 | Japan . |

*Primary Examiner*—N. Le
*Assistant Examiner*—Anh T. N. Vo
*Attorney, Agent, or Firm*—Sughrue, Mion, Zinn, Macpeak & Seas, PLLC

[57] ABSTRACT

In the improved thermal recording method in which image data supplied from an image data supply source are subjected to specified image processing jobs and in which a thermal head is driven in accordance with the processed image data so as to perform thermal recording, image processing jobs are performed in a specified order such that sharpness correction and tone correction are followed by shading correction and correction of resistance values which, in turn are followed by compensation for temperature elevation, provided that calculation treatment of respective values of the image data for the compensation for temperature elevation is performed either prior to or after either one of the corrections that are performed subsequent to the tone correction. It is preferred that black ratio correction and/or load variation correction are also performed after the shading correction and the correction of resistance values, and prior to the compensation for temperature elevation. The improved thermal recording apparatus is used to carry out the thermal recording method described above. According to these apparatus and method, high quality images can be recorded consistently.

20 Claims, 4 Drawing Sheets

METHOD AND APPARATUS FOR THERMAL RECORDING

BACKGROUND OF THE INVENTION

This invention relates a thermal recording method using a thermal head. This invention also relates to a thermal recording apparatus.

Thermal recording materials comprising a thermal recording layer on a substrate such as a film, which are hereunder referred to as thermal materials, are commonly used to record the images produced in diagnosis by ultrasonic scanning.

This recording method, commonly referred to as thermal image recording, eliminates the need for wet processing and offers several advantages including convenience in handling. Hence, the use of the thermal image recording system is not limited to small-scale applications such as diagnosis by ultrasonic scanning and an extension to those areas of medical diagnoses such as CT, MRI and X-ray photography where large and high quality images are required is under review.

As is well known, thermal image recording involves the use of a thermal head having a glaze in which heat-generating elements are arranged in one direction and, with the glaze a little pressed against the thermal material (thermal recording layer), the thermal material is relatively moved in the direction perpendicular to the direction in which the glaze extends, and the respective heat-generating elements of the glaze are heated imagewise by energy application to heat the thermal recording layer of the thermal material, thereby accomplishing image reproduction.

In such a thermal recording apparatus, the image processing unit receives image data from an image data supply source such as CT or MRI diagnosis apparatus, and subjects these image data to specified image processing (compensation) jobs, such as sharpness correction, tone correction and the like, to obtain data for the image to be thermally recorded. The thermal head is driven according to these thermal recording image data to heat the respective heat-generating elements, whereupon the image in accordance with the image data supplied from the image data supply source is thermally recorded.

The image processing jobs performed in the image processing unit of the thermal recording apparatus include specifically sharpness correction for edge enhancement of the image; tone correction for producing an appropriate image in accordance with the gamma (γ-) value of the thermal material and individual differences of the thermal recording apparatus; compensation for temperature elevation for adjusting the energy of heat generation in accordance with the temperature of the heat-generating elements; shading correction for correcting the uneven density caused by the shape variability and other factors of the glaze on the thermal head; correction of resistance values for correcting differences between the resistance values of the individual heat-generating elements; and black ratio correction for ensuring that image data representing the same density will yield a color of the same density in spite of the variation in the drop of supply voltage to the thermal head due to the change in the pattern of the images to be recorded; and load variation correction for correcting the stripe-shaped unevenness in density due to the friction force variation in the interface between the thermal material and the thermal head in accordance with the recording density.

In image recording apparatus, image data are usually supplied as numerical data and this is also the case with thermal recording apparatus; image data are supplied as numerical data, say, 10-bit digital data from an image data supply source and subjected to various kinds of image processing jobs such as multiplication of the image data by coefficients of corrections and averaging of the image data.

However, if more than one kind of such image processing jobs that involve direct change of image data are performed, appropriate image processing jobs cannot be accomplished depending on the order of processing and the intended effects of corrections cannot be attained but only reduced image quality of recorded images will sometimes result, thus failing to produce images of the desired quality.

Such a reduced quality of the recorded images can be a serious problem in applications that require the recording of high quality images. Especially, in the applications that require high quality images such as the above-stated medical applications, the reduction in image quality is an obstacle to the viewing of the correct image, potentially leading to a wrong diagnosis.

SUMMARY OF THE INVENTION

The present invention has been accomplished under these circumstances and has as an object providing a method of thermal recording with a thermal head, in which the intended effects of corrections can be fully attained in all kinds of image processing (correction) jobs that are performed so as to produce appropriately processed image data of thermal recording which thereby enable consistent recording of high quality thermal images.

Another object of the invention is to provide an apparatus for performing thermal recording by employing said method.

To achieve the above object, the invention provides a thermal recording method in which image data supplied from an image data supply source are subjected to specified image processing jobs and in which a thermal head is driven in accordance with the processed image data so as to perform thermal recording, said image processing jobs being performed in a specified order such that sharpness correction and tone correction are followed by shading correction and correction of resistance values which, in turn are followed by compensation for temperature elevation, provided that representative value calculation treatment of the image data for said compensation for temperature elevation is performed either prior to or after either one of the corrections that are performed subsequent to the tone correction.

It is preferred that black ratio correction and/or load variation correction are also performed after said shading correction and said correction of resistance values, and prior to said compensation for temperature elevation.

It is also preferred that said sharpness correction is followed by said tone correction, or that said tone correction is followed by said sharpness correction. It is more preferred that in the latter case, thereafter, of the recording data obtained after said sharpness correction, the recording data which are below the value $kE_0$ obtained by multiplying the recording data value $E_0$ corresponding to the image data value 0 by the constant k ($k<1$) are all converted into $kE_0$.

It is further preferred that whichever of the shading correction and the correction of resistance values that has the greater dependency on image density is performed earlier than the other and if the two corrections are equivalent in dependency on image density, either correction is performed earlier than the other or the two are performed simultaneously.

It is further preferred that said black ratio correction is followed by said load variation correction.

The invention also provides a thermal recording apparatus comprising:

a thermal head having a glaze with a unidirectional array of heat-generating elements;

means for relatively moving a thermal recording material to the thermal head in the direction perpendicular to the direction in which said heat-generating elements are arranged, with said glaze being in contact with the thermal recording material;

image processing means by which image data supplied from an image data supply source are subjected to sharpness correction and tone correction which are followed by shading correction and correction of resistance values which, in turn, are followed by compensation for temperature elevation, provided that representative value calculation treatment of the image data for said compensation for temperature correction is performed either prior to or after either one of the corrections that are performed subsequent to the tone correction; and recording control means which drives said thermal head on the basis of the image data that have been processed by said image processing means.

It is preferred that said image processing means performs also black ratio correction and/or load variation correction after said shading correction and said correction of resistance values, and prior to said compensation for temperature elevation.

It is also preferred that said image processing means performs said tone correction after said sharpness correction, or that said image processing means performs said sharpness correction after said tone correction. It is more preferred that in the latter case, thereafter, of the recording data obtained after said sharpness correction, the recording data which are below the value $kE_0$ obtained by multiplying the recording data value $E_0$ corresponding to the image data value 0 by the constant k (k<1) are all converted into $kE_0$.

It is further preferred that in said image processing means, whichever of said shading correction and said correction of resistance values that has the greater dependency on image density is performed earlier than the other and if the two corrections are equivalent in dependency on image density, either correction is performed earlier than the other or the two are performed simultaneously.

It is further preferred that said image processing means performs said load variation correction after said black ratio correction.

BRIEF DESCRIPTION OF THE DRAWINGS

FIG. 3*a* shows an example of the recording data in the main scanning direction, after tone correction and before sharpness correction. FIG. 3*b* shows an example of the recording data immediately after the recording data of FIG. 3*a* were subjected to the sharpness correction. FIG. 3*c* shows an example of the recording data obtained by subjecting the recording data of FIG. 3*b* to the false edge reducing treatment of the invention. FIG. 3*d* shows an example of the image thermally recorded according to the pattern of the recording data of FIG. 3*c*.

FIG. 4*a* shows an example of the recording data in the main scanning direction, after tone correction and before sharpness correction. FIG. 4*b* shows an example of the recording data immediately after the recording data of FIG. 4*a* were subjected to the sharpness correction. FIG. 4*c* shows an example of the image thermally recorded according to the pattern of the recording data of FIG. 4*b*.

DETAILED DESCRIPTION OF THE INVENTION

The thermal recording method of the invention and the thermal recording apparatus of the invention making use of this method will now be described in detail with reference to the preferred embodiments shown in the accompanying drawings.

Figure 1:
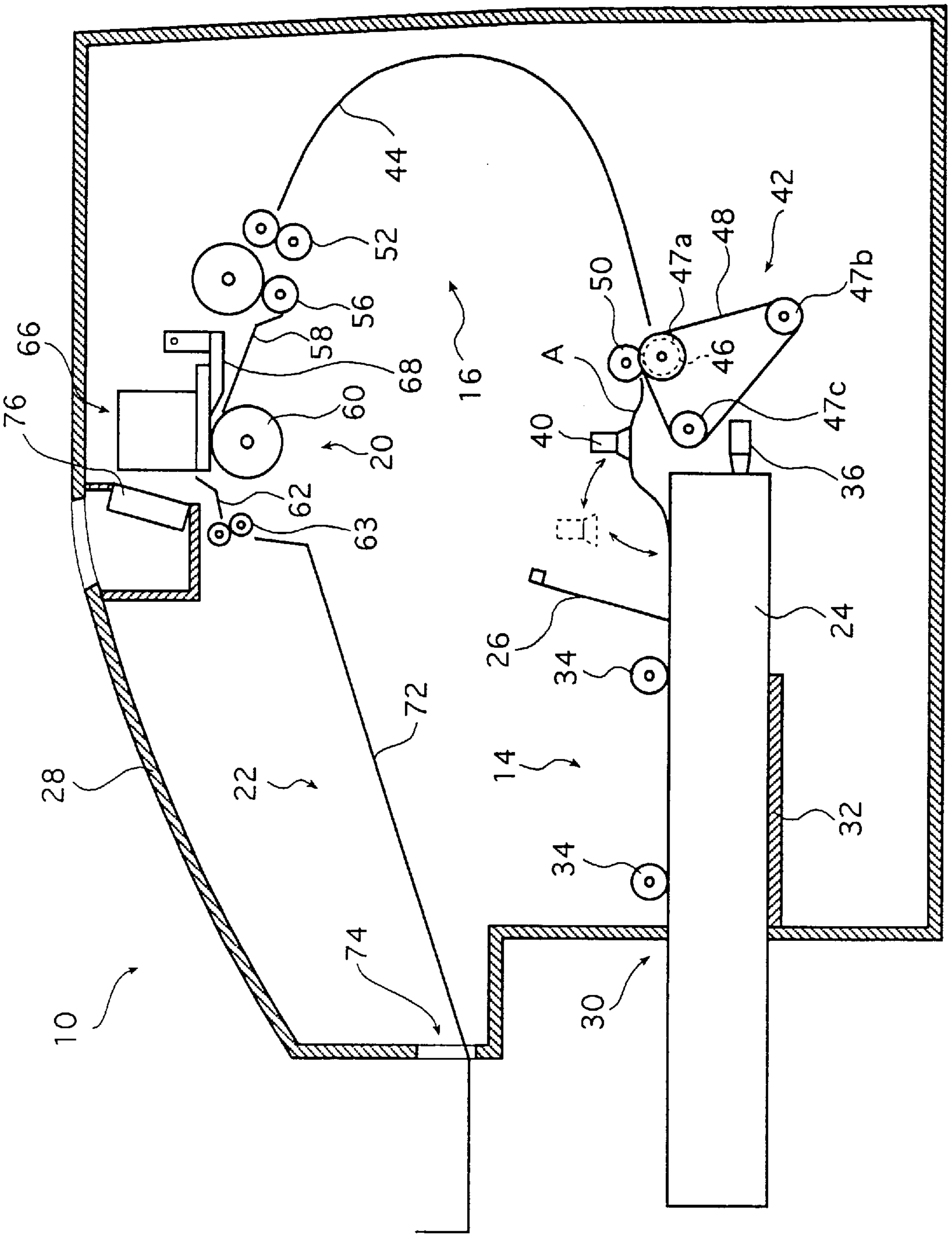
FIG. 1 is a schematic view of an embodiment of the thermal recording apparatus according to the invention.

FIG. 1 shows schematically an embodiment of the thermal recording apparatus of the invention making use of the thermal recording method of the invention.

Figure 2:
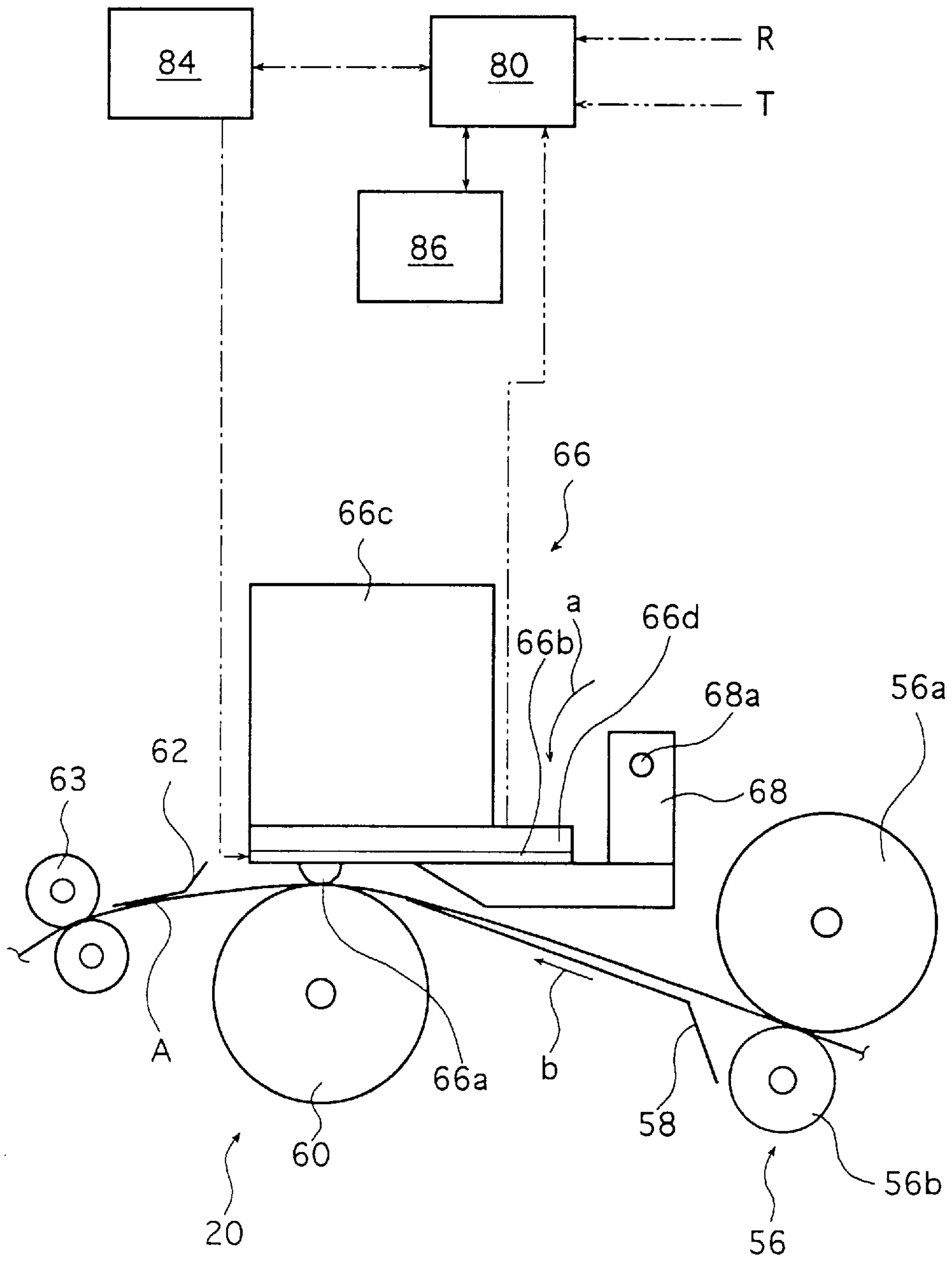
FIG. 2 shows a schematic view of the recording section of the thermal recording apparatus shown in FIG. 1 and a block diagram of a system for controlling the recording section.

The thermal recording apparatus generally indicated by 10 in FIG. 1 and which is hereunder simply referred to as a "recording apparatus" performs thermal image recording on thermal recording materials of a given size, say, B4 (namely, thermal recording materials in the form of cut sheets, which are hereunder referred to as "thermal materials A"). The apparatus comprises a loading section 14 where a magazine 24 containing thermal materials A is loaded, a feed/transport section 16, a recording section 20 performing thermal image recording on thermal materials A by means of the thermal head 66, and an ejecting section 22. In addition, as shown in FIG. 2, the thermal head 66 in the recording section 20 is connected to an image processing unit 80 and a recording control unit 84, and the image processing unit 80 in turn is connected to a data storage unit 86.

In the thus constructed recording apparatus 10, the feed/transport section 16 transports the thermal material A to the recording section 20, where the thermal material A against which the thermal head 66 is pressed is transported in the direction perpendicular to the direction in which the glaze extends (normal to the papers of FIGS. 1 and 2) and in the meantime, the individual heat-generating elements are actuated imagewise to perform thermal image recording on the thermal material A.

The thermal materials A comprise respectively a substrate of film such as a transparent polyethylene terephthalate (PET) film, paper and the like which is overlaid with a thermal recording layer.

Typically, such thermal materials A are stacked in a specified number, say, 100 to form a bundle, which is either wrapped in a bag or bound with a band to provide a package. As shown, the specified number of thermal materials A bundled together with the thermal recording layer side facing down are accommodated in the magazine 24 of the recording apparatus 10, and they are taken out of the magazine 24 one by one to be used for thermal image recording.

The magazine 24 is a case having a cover 26 which can be freely opened. The magazine 24 which contains the thermal materials A is loaded in the loading section 14 of the recording apparatus 10.

The loading section 14 has an inlet 30 formed in the housing 28 of the recording apparatus 10, a guide plate 32, guide rolls 34 and a stop member 36; the magazine 24 is inserted into the recording apparatus 10 via the inlet 30 in such a way that the portion fitted with the cover 26 is coming first; thereafter, the magazine 24 as it is guided by the guide plate 32 and the guide rolls 34 is pushed until it contacts the stop member 36, whereupon it is loaded at a specified position in the recording apparatus 10.

The feed/transport section 16 has the sheet feeding mechanism using the sucker 40 for grabbing the thermal material A by application of suction, transport means 42, a transport guide 44 and a regulating roller pair 52 located in the outlet of the transport guide 44; the thermal materials A are taken out of the magazine 24 in the loading section 14 and transported to the recording section 20.

The transport means 42 is composed of a transport roller 46, a pulley 47*a* coaxial with the roller 46, a pulley 47*b* coupled to a rotating drive source, a tension pulley 47*c*, an endless belt 48 stretched between the three pulleys 47*a*, 47*b* and 47*c*, and a nip roller 50 that is to be pressed onto the transport roller 46. The forward end of the thermal material A which has been sheet-fed by means of the sucker 40 is pinched between the transport roller 46 and the nip roller 50 such that the material A is transported downstream.

When a signal for the start of recording is issued, the cover 26 is opened by the OPEN/CLOSE mechanism (not shown) in the recording apparatus 10. Then, the sheet feeding mechanism using the sucker 40 picks up one sheet of thermal material A from the magazine 24 and feeds the forward end of the sheet to the transport means 42 (to the nip between rollers 46 and 50). At the point of time when the thermal material A has been pinched between the transport roller 46 and the nip roller 50, the sucker 40 releases the material, and the thus fed thermal material A is supplied by the transport means 42 into the regulating roller pair 52 as it is guided by the transport guide 44. At the point of time when the thermal material A to be used in recording has been completely ejected from the magazine 24, the OPEN/CLOSE mechanism closes the cover 26.

The distance between the transport means 42 and the regulating roller pair 52 which is defined by the transport guide 44 is set to be somewhat shorter than the length of the thermal material A in the direction of its transport. The advancing end of the thermal material A first reaches the regulating roller pair 52 by the transport means 42. The regulating roller pair 52 are normally at rest. The advancing end of the thermal material A stops here and is subjected to positioning.

When the advancing end of the thermal material A reaches the regulating roller pair 52, the temperature of the thermal head 66 (glaze 66*a*) is checked and if it is at a specified level, the regulating roller pair 52 start to transport the thermal material A, which is transported to the recording section 20.

FIG. 2 shows schematically the recording section 20.

The recording section 20 has the thermal head 66, a platen roller 60, a cleaning roller pair 56, a guide 58, a fan 76 for cooling the thermal head 66 (see FIG. 1), a guide 62, as well as the image processing unit 80 and the recording control unit 84 constituting the recording control system. The thermal head 66 is capable of thermal image recording at a recording (pixel) density of, say, about 300 dpi for example on thermal films of B4 size at maximum. The head comprises a body 66*b* having the glaze 66*a* in which the heat-generating elements performing thermal recording on the thermal material A are arranged in one direction (perpendicular to the papers of FIGS. 1 and 2), and a heat sink 66*c* fixed to the body 66*b*. The thermal head 66 is supported on a support member 68 that can pivot about a fulcrum 68*a* either in the direction of arrow a or in the reverse direction.

The platen roller 60 rotates at a specified image recording speed while holding the thermal material A in a specified position, and transports the thermal material A in the direction perpendicular to the main scanning direction (direction of arrow b in FIG. 2).

The cleaning roller pair 56 comprises an adhesive rubber roller 56*a* made of an elastic material and a non-adhesive roller 56*b*. The adhesive rubber roller 56*a* picks up dirt and other foreign matter that has been deposited on the thermal recording layer in the thermal material A, thereby preventing the dirt from being deposited on the glaze 66*a* or otherwise adversely affecting the image recording operation.

Before the thermal material A is transported to the recording section 20, the support member 68 in the illustrated recording apparatus 10 has pivoted to UP position (in the direction opposite to the direction of arrow a) so that the thermal head 66 (or glaze 66*a*) is not in contact with the platen roller 60.

When the transport of the thermal material A by the regulating roller pair 52 starts, said material is subsequently pinched between the cleaning rollers 56 and transported as it is guided by the guide 58. When the advancing end of the thermal material A has reached the record START position (i.e., corresponding to the glaze 66*a*), the support member 68 pivots in the direction of arrow a and the thermal material A becomes pinched between the glaze 66*a* on the thermal head 66 and the platen roller 60 such that the glaze 66*a* is pressed onto the recording layer while the thermal material A is transported in the direction indicated by arrow b by means of the platen roller 60 (as well as the regulating roller pair 52 and the transport roller pair 63) as it is held in a specified position.

During this transport, the individual heat-generating elements on the glaze 66*a* are actuated imagewise to perform thermal image recording on the thermal material A.

In the description below, thermal recording on thermal materials A is performed by controlling the heat generated by the respective heat-generating elements of the glaze 66*a* on the thermal head 66 by means of pulse width modulation (PMW; constant quantity of heat generation, controlled heat generation time). However, the invention is not limited to this type of modulation, and any known modulations such as pulse amplitude modulation (PAM; constant heat generation time, controlled quantity of heat generation) and pulse number modulation (PNW; controlled number of the same pulses having a constant quantity of heat generation) may be used in the control of the heat generated by the respective heat-generating elements.

As described above, the system for controlling the recording with the thermal head 66 is essentially composed of the image processing unit 80 and the recording control unit 84. The image processing unit 80 is connected to the data storage unit 86 for storing data for various image processing (correction) jobs performed in the image processing unit 80, and image data supplied from the image data supply source R.

Furthermore, the base 66*d* of the heat sink 66*c* in the illustrated thermal head 66 comprises thermistors in the area corresponding to the glaze, at a specified distance, for example at five sites. The respective thermistors detect the temperature of the glaze 66*a* (i.e., the temperature of the heat-generating elements at those sites). As seen in the two-dot chain lines, the detection results are outputted to the image processing unit 80, which receives these detection results and determines the temperatures of the respective heat-generating elements for example by linear interpolation. The recording section 20 comprises a thermometer T for detecting the ambient temperature around the thermal head 66, and outputs measurement results to the image processing unit 80.

Image data from an image data supply source R such as CT or MRI are outputted to the image processing unit 80, as 10-bit digital data (representing 0–1023).

The image processing unit 80 is the combination of various kinds of image processing circuits and memories; it receives image data from the image data supply source R and performs specified image processing (correction) jobs, and as required, performs formatting (i.e., enlargement or reduction and the frame assignment) to obtain data for the image to be thermally recorded by means of the thermal head 66.

In the thermal recording apparatus according to the invention, these corrections are performed in a specified order such that sharpness correction and tone correction (density correction) are followed by shading correction and correction of resistance values which, in turn are followed by compensation for temperature elevation, provided that calculation treatment (step) of representative values of image data (for example, thinning-out treatment as a typical example) for compensation for temperature elevation is performed either prior to or after either one of the image processing jobs subsequent to the tone correction. In the illustrated recording apparatus 10, for example, the image processing jobs may be performed in the order such that sharpness correction is followed by tone correction which, in turn, is followed by calculation treatment of representative values of image data for compensation for temperature elevation which, in turn, is followed by shading correction and correction of resistance values (at the same time) which, in turn, are followed by black ratio correction which, in turn, is followed by load variation correction which, in turn, is followed by compensation for temperature elevation. Alternatively, the image processing jobs may be performed in the order such that tone correction is followed by sharpness correction (including false edge reducing treatment) which, in turn, is followed by shading correction which, in turn, is followed by calculation treatment of representative values of image data for compensation for temperature elevation which, in turn, is followed by correction of resistance values which, in turn, is followed by black ratio correction which, in turn, is followed by load variation correction which, in turn, is followed by compensation for temperature elevation. In the above two cases, the latter is more preferable.

In the invention, the order of tone correction and sharpness correction, the order of shading correction and correction of resistance values, the necessity of black ratio correction and load variation correction, and if necessary the order thereof, as well as the timing (order) of calculation treatment of representative values of image data for compensation for temperature elevation can be selected appropriately depending on the types and the sizes of the thermal materials A, the recording apparatus 10, the image quality required to the image to be recorded, and the combination thereof.

Various corrections performed according to the method of the invention are now described.

Sharpness correction is performed to improve image sharpness by edge enhancement of the recorded image in order to obtain well modulated clear images.

While sharpness correction can be performed by various known methods, an exemplary procedure will be as follows.

Assume that one screen of the image is dividable into n×n pixels, with $S_{ij}$ being written (i=1, 2, . . . , n; j=1, 2, . . . , n) for the image data of the pixel that are on a specified pixel line i and which are the ith in the direction in which the glaze 66*a* extends. The first step of sharpness correction is to convert the image data $S_{ij}$ to a first unsharpness signal $U^1_{ij}$ which is electrically blurred image data.

The first unsharpness signal $U^1_{ij}$ is obtained by averaging the image data $S_{ij}$ and the surrounding image data and determined as:

$$U^1ij = \sum_{k=i-L}^{i+L} \sum_{m=j-L}^{j+L} s_{km}/M^2 \tag{1}$$

where M is the mask size, or the number of pixels used to construct the first unsharpness signal $U^1_{ij}$, and L is defined as (M−1)/2.

Then, the first unsharpness signal $U^1_{ij}$ is further averaged to calculate a second unsharpness signal $U^2_{ij}$. The second unsharpness signal $U^2_{ij}$ is calculated by the following equation:

$$U^1ij = \sum_{k=i-L}^{i+L} \sum_{m=j-L}^{j+L} U_{km}/M^2 \tag{2}$$

In the next place, the difference between the first unsharpness signal $U^1_{ij}$ and the second unsharpness signal $U^2_{ij}$ is determined. The difference is multiplied by the coefficient K of sharpness correction and added to the first unsharpness signal $U^1_{ij}$ (see the following equation 3) to produce a sharpness corrected image data $S_{ij}$:

$$S_{ij}=U^1_{ij}+K\cdot(U^1_{ij}-U^2_{ij}) \tag{3}$$

The sharpness of a thermally recorded image is affected by the temperature of the thermal head 66 (or the heat-generating elements), the recording speed and the gamma value of the thermal material A such that the sharpness of the recorded image decreases with the increasing temperature of the thermal head 66 and with the increasing recording speed in the auxiliary scanning direction but with the decreasing gamma value of the thermal material A and with the decreasing recording speed in the main scanning direction. If necessary, sharpness correction may be performed by altering correspondingly the relevant coefficient K in accordance with the temperatures of heat-generating elements, the recording speeds (main and auxiliary directions) and the gamma value of the thermal material A.

In this case, according to an exemplary method, tables (or functions) for weighting coefficients in accordance with the temperature of the heat-generating elements, the recording speeds, the gamma value of the thermal material and the like on the sharpness correction coefficient are constructed, and when sharpness correction is performed, these weighting coefficients are read out to be multiplied by the coefficient of sharpness correction K.

Tone correction (density correction) is such that the image data are corrected in accordance with various factors such as the operating condition of the recording apparatus and the gamma value of the thermal material A so as to produce images which represent appropriate tones (densities).

As already mentioned, recording apparatus 10 receives the image data as 10-bit digital data and performs image recording in accordance with those data. Suppose here that image data representing 512 in terms of a digital value corresponds to a density (D) of 1.2; then, the apparatus in principle is required to output an image with a density of 1.2 if it is supplied with image data for 512. However, the apparatus have individual differences and are subject to different conditions, for example, with respect to the environment in which they are installed. In addition, the gamma value of the thermal material A varies with manufacturer, production lot and other factors. Under the circumstances, it is impossible for all units of apparatus to output images that have specified densities in conformity with the supplied image data. This is why tone correction is performed and thermal recorded images are formed that represent appropriate tones in accordance with the image data.

In ordinary thermal recording apparatus including the illustrated apparatus 10, the image data supplied from the source R are transformed by the tone correction to image data that are associated with the heat generated during thermal recording.

The method of tone correction is not limited to any particular types and various known techniques may be employed. In an exemplary method, a correction chart is constructed that has images of varying densities recorded with the apparatus 10 and the densities of those images are measured with a densitometer and, on the basis of the measured data and the image densities which should be produced by the apparatus 10, a correction table, namely a tonal curve (or tone correction function) is constructed with the aid of an algorithm for density correction and the image data are transformed with the aid of the correction table.

Speaking of the image data that have been subjected to tone correction such that they are transformed to be associated with the heat generated during thermal recording, they are preferably such that recording energy insufficient for the thermal material A to form color (desirably just short of forming color) is supplied to the thermal head 66, even when the image data have the recording density of zero, and it is preferred to construct the correction table in such a way as to meet this requirement.

With this design, the difference between the temperatures provided by respective heat-generating elements during recording can be sufficiently reduced to minimize the temperature distribution through the thermal head 66 and thereby produce images of high quality. In addition, if the base of the thermal material A is a clear PET film or the like, the surface of the thermal material A can be melted only slightly so that the random reflection of light is sufficiently reduced to improve the transparency of the thermal material A.

Shading correction is performed to correct the uneven density caused by the shape variability and other factors of the glaze 66*a* on the thermal head 66.

As described above, the thermal head 66 has the glaze in which the heat-generating elements are arranged in one direction. It is difficult to make the shape of the glaze 66*a* uniform through all of the pixels, and usually the individual pixels have a certain shape variability. Further, the quantity of the heat generated by the respective heat-generating elements varies with the position in the direction in which the glaze 66*a* extends. Therefore, termed "shading", the unevenness in density due to the shape variability and the difference of the glaze position will be produced, even if image recording is performed using image data having the same recording density. Shading correction is required to correct this unevenness in density.

The method of shading correction is not limited to any particular type. In an exemplary method, an energy of heat generation corresponding to the image data having a specified density is supplied to all of the pixels (heat-generating elements) on the thermal head 66 to form actually a thermal recording image. The thus obtained image density is optically measured using a densitometer, whereby shading correction data (correction coefficients) which correct image data in such a way that the image to be recorded will have a uniform density is calculated in each pixel on the basis of both the recording density corresponding to the image data, and the actually measured density of the recorded image. The thus obtained shading correction data are stored in the data storage unit 86, and subsequently used to be multiplied by the image data. As another example, there is provided a method in which similar energy of heat generation is supplied to all of the pixels on the thermal head 66 to measure the quantity of the heat generated by the respective pixels, from which shading correction data as similar as that described above are calculated to be used subsequently for compensation.

Furthermore, if necessary, correction coefficients (correction tables) for shading correction data may be constructed in accordance with the image data (image density), the temperature of the thermal head 66, the recording speed, and the temperature, the moisture, the gamma value of the thermal material A, and shading correction may be performed by correcting the shading correction data according to these factors.

The correction of resistance values is such that the difference between the resistance values of adjacent heat-generating elements is corrected to produce appropriate images.

The resistance values of the heat-generating elements in the thermal head 66 are not uniform but they scatter on account of various factors such as manufacturing errors and the scattering in raw materials. The resistance values of the heat-generating elements which are resistors also vary with use, i.e., the heating time and energy (history of heat generation); however, the history of heat generation from the individual heat-generating elements is not uniform and the variations in resistance values also change with time, causing variations in the scattering of the resistance values.

On account of this scattering of resistance values, the heat-generating elements will generate different amounts of heat even if they are energized for the same period of time and this has been one of the causes of unevenness in the densities of recorded images. It is therefore necessary to compensate for this problem by performing the correction of resistance values.

The method for the correction of resistance values is not limited to any particular types. In an exemplary technique, the resistance values of the individual heat-generating elements are measured and data for correction are calculated for each heat-generating element (e.g. R/Rm, where R is the resistance value of a particular heat-generating element and Rm is the highest of the resistance values of all heat-generating elements) and stored in the data storage unit 86 so that the image data will subsequently be multiplied by the stored data.

Another technique depends on the fact that the resistance values of the heat-generating elements are also influenced by the temperature of the thermal head 66 (or the heat-generating elements in it) and the image data (image density). A table (function) of correction coefficients is preliminarily constructed and stored in the memory (e.g. data storage unit 86) for the correction data associated with those factors and a specific correction coefficient is read out of the memory in accordance with the temperature of a particular heat-generating element and the image data and the correction data are multiplied by that coefficient to correct the resistance value of that heat-generating element.

Black ratio correction is performed to ensure that the same image data will yield color formation at the same density irrespective of the change in the drop of the supply voltage to the thermal head due to the change in the recording pattern.

For instance, if one line of image data contains many high density areas, more heat-generating elements will be energized simultaneously and the resulting increase in the current flow causes a corresponding voltage drop due to the internal resistance of the power cable or the like which connect the power supply and the thermal head. As a consequence, the supply voltage to be supplied to the thermal head varies between lines or heat-generating elements depending on the density of a particular image data and the same image data will produce recorded images that have differences in density. This problem is called "unevenness in black ratio" and the unevenness in density due to this phenomenon must be compensated by performing black ratio correction.

The method of black ratio correction is not limited to any particular types and various known techniques may be employed. In a typical method, the image data for each pixel are summed up for each line to calculate the total energy to be applied for one line and on the basis of the thus calculated total energy, the image data for the individual pixels are corrected; this method assumes a constant voltage drop for one line and compensation is made for the loss of thermal energy due to the voltage drop for the image data on each pixel.

A more preferred method of black ratio correction is by using the following formula (a). In the method outlined in the preceding paragraph, the same correction is performed based on the total energy for one line and the pixels of lower density tend to be overcorrected. However, the preferred method which uses the formula (a) has the advantage that the black ratios of image data for the individual pixels can be corrected optimally in the overall density range.

$$\left.\begin{array}{l} H(D) = 1 - \sum_{n=1}^{N} \frac{D'(n)}{N \times M} \\ \text{Here} \\ D'(n) = \begin{cases} D(n) & (D(n) < D) \\ D & (D(n) \geqq D) \end{cases} \\ Dc(n) = D(n) \times \{1 - k \times H(D(n))\} \end{array}\right\} \quad \text{(a)}$$

Where N denotes the number of pixels of one line, D denotes the image data, M denotes the maximum value of the image data, k denotes the correction coefficient, D(n) denotes the image data before correction of the pixel n, H(D) denotes the correction data value for the image data D, $D_c(n)$ denotes the image data after correction of the pixel n.

In the above formula (a), first of all, the correction data values H(D) corresponding to the respective image data D are calculated. For example, in the apparatus having image data D of 2048 tones in the range from 0 to 2047, 2048 correction data values between H(0) and H(2047) corresponding to these image data are calculated.

When the image data before correction D(n) is equal to or greater than the image data D, D'(n) is taken for the image data D, and when the image data D(n) is smaller than the image data D, D'(n) is taken for the image data D(n). The image data after correction $D_c(n)$ are calculated using the correction data values H (D(n)) corresponding to the image data before correction D(n) of the individual pixels n.

If the calculation is effected using the above formula (a), the calculation volume will be enormous. The calculation volume can be however significantly reduced by using the following formula.

When C(D) is represented by the following formula (b):

$$\left.\begin{array}{l} C(D) = 1 - \sum_{n=1}^{N} D'(n) \\ \text{Here} \\ D'(n) = \begin{cases} D(n) & (D(n) < D) \\ D & (D(n) \geqq D) \end{cases} \end{array}\right\} \quad \text{(b)}$$

H(D) is represented by the formula: H(D)=1−C(D)/(N×M).

When D is equal to M, C(D), that is C(M) is calculated by the formula (b) as seen below:

$$C(M) = \sum_{n=1}^{N} D(n)$$

As C(M−1) is calculated as M→M−1, when the number of pixels of the image data M is represented by hst(M), C(M−1) is represented as follows:

$$C(M-1)=C(M)-hst(M)$$

As C(M−2) is calculated as M−1, M→M−2, C(M−2) is represented as follows:

$$\begin{aligned} C(M-2) &= C(M) - hst(M-1) - 2 \times hst(M) \\ &= C(M-1) - hst(M-1) - hst(M) \end{aligned}$$

In a similar manner as above, C(M−n) is in general represented by the formula:

$$C(M-n) = C(M-n+1) - \sum_{L=M-n+1}^{M} hst(L)$$

Therefore, the calculation procedure is as follows:

Step 1:

The total of the data values of all pixels of one line (S total), and the histograms of the respective image data contained in one line (hst(0), hst(1), . . . , hst (M)) are calculated.

Step 2:

The correction values corresponding to the respective image data are calculated as follows:

S(M)=0

C(M)=S total $S(M-1)=S(M)+hst(M)$ $C(M-1)=C(M)-S(M-1)$ $S(M-2)=S(M-1)+hst(M-1)$ $C(M-2)=C(M-1)-S(M-2)$

. . .

$S(1)=S(2)+hst(2)$ $C(1)=C(2)-S(1)$

Step 3:

The respective pixels of one line are corrected as follows (k denotes the correction coefficient):

$$D_c(n)=D(n)\times\{1-k\times(1-C(D(n))/(N\times M))\}$$

This method of black ratio correction is described in detail in the Japanese paten application No. 8-25036 by the applicant.

In the thermal recording apparatus 10, there appears friction force (or torque) variation in the interface between the thermal material A and the thermal head 66 in accordance with image density to be recorded on the thermal material A.

Accordingly, there is a problem that around boundary portions of the thermal material where recording image changes from the portion to be recorded in low density to the portion to be recorded in high density, transporting speed of the thermal material increases instantaneously at the boundary portion to cause decrease in recording density at the boundary portion and results in density unevenness appearing in white strips, while on the contrary at a boundary portion where recording image changes from the portion to be recorded in the high density to the portion to be recorded in the low density is observed a density unevenness appears in black strips.

Load variation correction is correction for preventing formation of the above striped density unevenness, which is as exemplified by the procedure that, based on a pre-calculated function indicating the relation between image data and the frictional forces (transport torque) within the thermal material and the thermal head, the change in frictional forces from the previous line to the present line is calculated, as indicated in the undermentioned formula, by subtracting the total sum of frictional force corresponding to each pixel of the present line from the total sum of frictional force corresponding to each pixel of the previous line, and image data for each pixel on respective line are corrected based on the changed amount of the frictional forces.

$$D'_n(i) = (1 + k \times Hn) \times Dn(i)$$

$$Hn = \sum_{i=1}^{N} f\{Dn-1(i)\} - \sum_{i=1}^{M} f\{Dn(i)\}$$

In the above, n is a line number of a recorded image, i is a pixel number on line n, $D'_n(i)$ and $D_n(i)$ indicate respectively image data before and after correction for image pixel i on line n, k is correcting coefficient, $H_n$ indicates the changed amount of the frictional force within the thermal material of n line and the thermal head, M is total number of pixels on 1 line, and f(D) is a functional formula indicating relationship between the image data value D and the frictional force within thermal material and thermal head.

Approximating relationships between the image data and the frictional force within the thermal materials and thermal head by use of a linear function enables the load variation correction to be accomplished simply by summing up respectively image data of the previous line and those of the present line and calculating the difference between the summed values for the previous line and the present line, which makes the abovementioned functional formula unnecessary and provides merits of improving the processing speed.

Based on a pre-calculated function indicating the relation between image data and frictional force within the thermal material and the thermal head and further based on a function indicating the relation between deformed amounts of the platen roller made of rubber and frictional force within the thermal materials and thermal heads, changed amount of deformed rubber platen rollers at each pixel site on each line is calculated, and in accordance with changed amount of deformed rubber platen rollers at each pixel site on each present line and correction factor of the previous line, or otherwise, in place of changed amount of deformed rubber platen rollers at each pixel site on each line, the sum of the average value of changed amount of deformed rubber platen rollers on each line and the average value of changed amount of deformed rubber platen rollers on each line in forward and backward site by m pixel are employed, to correct more accurately image data on the present line.

The load variation correction is described in detail JP-A 9-50295 by the Applicant.

Compensation for temperature elevation is performed to adjust the energy of heat generation in accordance with the temperature of the heat-generating elements and to correct the uneven density caused by the difference in the temperature history of the respective heat-generating elements.

The respective heat-generating elements on the thermal head 66 are heated for example by energizing these elements for a specified time period in accordance with the image data of each pixel in the image to be recorded. However, the temperatures of the heat-generating elements vary from each other depending on the recorded images (the history of heat generation) up to the previous line and, therefore, even if the respective heat-generating elements are energized with the constant current value for the same time period according to the same image data, temperature differences will occur between the heated heat-generating elements, thereby producing unevenness in density.

Therefore, the image data must be compensated for temperature elevation such that the quantity of the heat generation is corrected for each heat-generating element on the basis of the image data and the heat generation history up to the previous line.

The method of compensation for temperature elevation is not limited to any particular type, and various known techniques may be used. In an exemplary method, previously, as a pretreatment, the image to be recorded on one screen is divided into a specified number of regions (blocks) each having a specified number of pixels and a representative value for the image data is calculated in each divided region, and next, a predicted value of temperature for each region is calculated from this representative value for the image data, and the initial value of temperature detected by the themistors, a value of temperature correction for each region is calculated from this predicted value of temperature, and subjected to interpolation to calculate a value of temperature correction for each pixel of the image to be recorded on one screen, which is used to compensate the image data of each pixel.

More specifically, first, the image to be recorded on one screen is divided into a specified number of regions each having a specified number of pixels, for example, in the case where the image to be recorded on one screen consists of 3072 pixels in the horizontal direction and 4224 pixels in the vertical direction, said image is divided into a grid pattern of 25×133 regions each consisting of 128×32 pixels.

Then, the representative value for the image data of each divided region is calculated by the method in which the image data corresponding to a specified pixel in the region is a representative value, or the method in which the average of the image data corresponding to a specified number of pixels remaining in the region after the pixel thinning out is a representative value (thinning-out treatment), or the method in which the average of the image data corresponding to all pixels in the region is a representative value. The pretreatment for the compensation for temperature elevation in which the representative value for the image data of each divided region is calculated is thus performed.

Then, the predicted value of temperature is calculated from the representative values for the image data of respective regions, as well as the initial values of temperature obtained from the temperatures of the thermal head 66 (base 66*d* of the heat sink) detected by said thermistors and the ambient temperature detected by the thermometer T. According to an exemplary method of calculating the predicted value of temperature, the heat transmission system of the thermal head 66 is likened to an electric equivalent circuit of a CR model consisting of a capacitance component C and a resistance component R, and the quantity of the heat generated by the heat transmission system per unit time, the temperature, the heat capacity and the heat resistance are replaced by the current, voltage, capacitance and resistance of an equivalent electric system, respectively.

The value of temperature correction for each region is calculated from the predicted value of temperature obtained, using a predetermined formula, and then subjected to interpolation to calculate the value of temperature correction for each pixel of the image to be recorded on one screen, using a predetermined formula. This value is used to perform temperature correction of the image data.

The process of compensation for temperature elevation as mentioned above, is described in detail in the Japanese patent application No. 8-25035 by the applicant.

In the thermal recording apparatus, the corrections mentioned above are performed on the image data from the supply source R to produce image data that are associated with the thermal recording to be performed with the thermal head 66.

In the thermal recording apparatus 10 of the present invention, sharpness correction and tone correction are followed by shading correction and correction of resistance values which, in turn, are followed by compensation for temperature elevation, and calculation treatment of representative values of image data for compensation for temperature elevation is performed either prior to or after either one of the corrections that are performed subsequent to the tone correction. Depending on the image quality level required, at least one of black ratio correction and load variation correction are also performed between shading correction and correction of resistance values on the one hand, and compensation for temperature elevation on the other hand.

As will be apparent from the foregoing description of the corrections (image processing jobs), sharpness correction and tone correction are performed in direct association with the images to be recorded and the amounts of corrections will vary with the supplied image data (which, in the illustrated case, are 10-bit digital data representing 0–1023) and, hence, are determined by the image data.

On the other hand, shading correction and the correction of resistance values are performed in order to compensate for the unevenness in density which is inherent in the recording apparatus 10 and the results are reflected in the correction of the image data.

Black ratio correction is associated with the voltage drop that occurs in the thermal head 66, and load variation correction is associated with the combination of the thermal material A with the recording apparatus 10 (thermal head 66). Therefore, these corrections are preferably performed as late as possible, on the image data just before the final image data being supplied to the thermal head 66.

As already mentioned, the compensation for temperature elevation involves detecting the ambient temperature and the temperature of the thermal head 66, predicting the elevation of the temperature of the thermal head 66 from the detected temperatures, and calculating the corrected value of temperature on the basis of the predicted value. Therefore, the compensation for temperature elevation is preferably performed just before the start of thermal recording, that is at the last stage of the image processing (correction) jobs. In other words, the apparatus is preferably adapted to be such that the line for which the compensation for temperature has ended is immediately subjected to recording (i.e. the necessary calculations for correction are performed during recording).

Under the circumstances, if the device-specific corrections such as shading correction and correction of resistance values are performed prior to the corrections that are directly associated with the image data such as tone correction and sharpness correction, the images to be produced will be affected by the device characteristics, producing images that are different from the intended images. In other words, the corrections such as shading correction which are performed in order to eliminate the unevenness in streaks which is inherent in the recording apparatus 10 will be reflected in the image data before corrections are performed that are directly associated with the images to be recorded (image data) and, as a result, sharpness correction and tone correction that are directly associated with the images to be recorded will also reflect the device characteristics, thereby failing to perform the appropriate correction.

Therefore, in principle, it is preferred to perform sharpness correction and tone correction prior to shading correction and correction of resistance values and compensation for temperature elevation at the last stage of the correction jobs, just before the start of recording, whereas black ratio correction and/or load variation correction is preferably delayed as much as possible.

The tone of the image to be recorded varies with the sensitivity and gradation of the thermal material A and the characteristics of the recording apparatus 10. Therefore, in the case where sharpness correction is performed after tone correction, the amount of sharpness correction may be varied depending on the combination of the thermal material A and the recording apparatus 10 as in the aforementioned case of shading correction and it is often impossible to accomplish the desired sharpness correction in a consistent manner. Therefore, in such a case, sharpness correction is preferably followed by tone correction.

In the tone correction, in order to record high quality images thermally by reducing the temperature differences of the respective heat-generating elements during recording, and the temperature distribution width of the entire thermal head, even if there are portions having a recording density of 0 (i.e., image data value inputted from the image data supply source is 0), this density is converted into a specified recording data value $E_0$ ($E_0>0$) such that a recording energy is applied to the extent that the thermal material A forms no color, (and preferably is in a state of immediately before color formation).

Figure 4A:
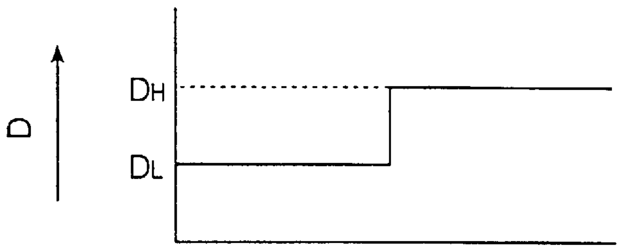
FIGS. 4*a*, 4*b* and 4*c* show typical diagrams of an embodiment of the conversion treatment according to the conventional thermal recording method.
Figure 4B:
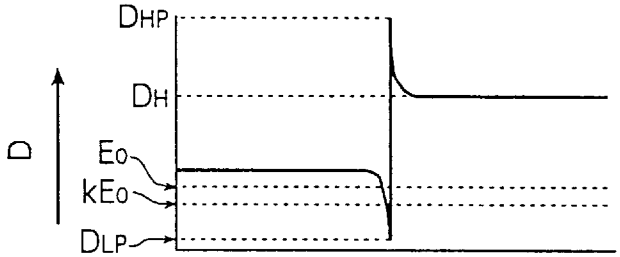
Figure 4C:
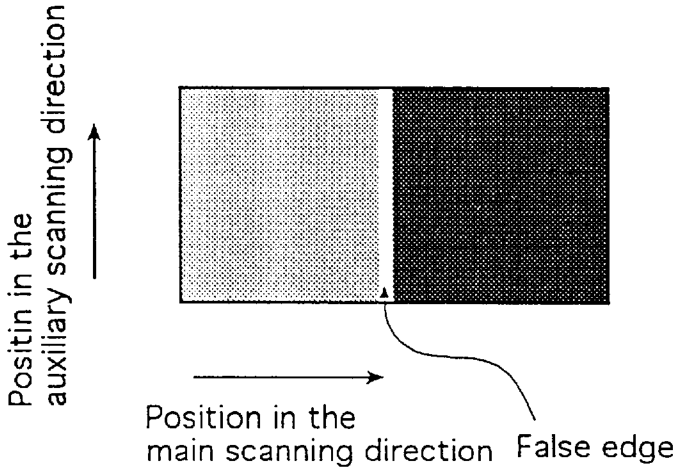

For this reason, in the case where tone correction is followed by sharpness correction, if the image to be recorded has in one line in the main scanning direction, a portion (hereafter referred to as edge portion) where the density of the edge changes abruptly from the recording data value on the higher density side $D_H$ to the recording data value on the lower density side $D_L$ as seen in FIG. 4*a*, a density difference of the edge portion is enhanced after the end of the sharpness correction, as seen in FIG. 4*b*. When the recording data value on the lower density side $D_L$ is equal or close to $E_0$, the enhanced peak value $D_{LP}$ of the value $D_L$ may be significantly smaller than $E_0$. Thus, in the image actually recorded, even if the heat diffusion in the edge portion moderates this enhancement, the portion which does not sufficiently form color subsists in the area where color is to be originally formed. This may pose a problem that the image data would have a false edge that looks white as seen in FIG. 4*c* and give a sense of inharmoniousness.

Such a false edge that appeared in the recorded image causes in some cases a serious problem, in the cases that require the recording of high quality images, especially in the cases where high precision images of middle tone are to be recorded. In particular, in the applications that require high quality images of high precision and middle tone as the above-stated medical applications, the false edge is an obstacle to the viewing of the correct image, potentially leading to a wrong diagnosis.

In such a case, according to the invention, the recording data D thus corrected for sharpness are subjected to the processing to convert the recording data D which are below a specified value into the specified value (hereafter referred to as false edge reducing treatment). Specifically, of said recording data D corrected for sharpness, the recording data D which are below the value $kE_0$ obtained by multiplying the recording data value $E_0$ corresponding to the image data value 0 by the constant k (k<1) are all converted into $kE_0$ to prevent the appearance of false edges.

Figure 3A:
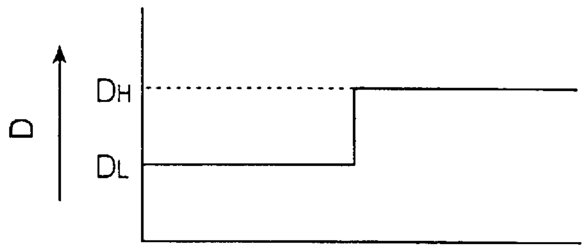
FIGS. 3*a*, 3*b*, 3*c* and 3*d* show typical diagrams of an embodiment of the conversion treatment according to the thermal recording method of the invention.
Figure 3B:
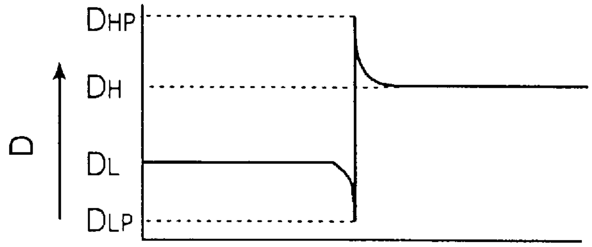
Figure 3C:
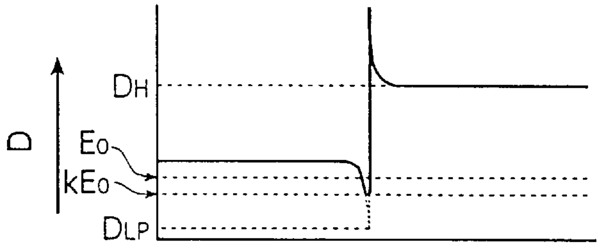
Figure 3D:
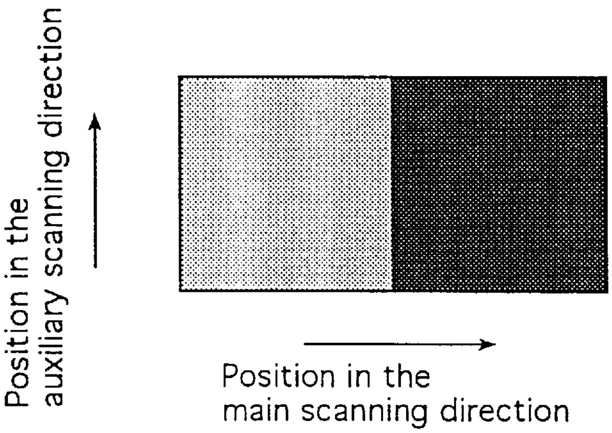

FIGS. 3*a*–3*d* show schematic diagrams of an example of the conversion treatment according to a further embodiment of the thermal recording method of the invention. FIG. 3*a* shows an example of the recording data in the main scanning direction, after tone correction and before sharpness correction. FIG. 3*b* shows an example of the recording data immediately after the recording data of FIG. 3*a* were subjected to the sharpness correction. FIG. 3*c* shows an example of the recording data obtained by subjecting the recording data of FIG. 3*b* to the false edge reducing treatment of the invention. FIG. 3*d* shows an example of the image thermally recorded according to the pattern of the recording data of FIG. 3*c*.

A further embodiment of the thermal recording method of the invention is now described with reference to FIGS. 3*a*–3*d*.

Assume that the pattern of the recording data D as seen FIG. 3*a* is obtained in the main scanning direction, by subjecting the image data inputted from the image data supply source to the tone correction. The middle portion of the pattern of the recording data D in FIG. 3*a* contains an edge portion where the recording data value (i.e., density) changes abruptly.

Then, by subjecting a series of recording data D having such an edge portion to said sharpness correction, the pattern of the recording data D with the edge portion being enhanced is obtained, as seen in FIG. 3*b*. That is, the image data value on the lower density side (the side where the image data value is smaller) $D_L$ around the edge portion, is converted into a smaller peak value $D_{LP}$, and a peak is formed downward (in the lower density direction) in the edge portion. On the other hand, the image data value on the higher density side (the side where the image data value is greater) $D_H$ around the edge portion, is converted into a greater peak value $D_{HP}$, and a peak is formed upward (in the higher density direction) in the edge portion.

As described above, if the data of FIG. 3*b* are directly recorded by the thermal head, there are cases where the peak portion on the lower density side (i.e. edge portion) forms no color even by the heat diffusion and looks white, whereupon causing a false edge, as seen FIG. 4*c*.

Therefore, according to this embodiment, the image data D corrected for sharpness are subjected to the conversion as described below to set the minimum value of the recording data D to $kE_0$, whereby preventing the value of the recording data corrected for sharpness from decreasing unnecessarily, as seen FIG. 3*c*. In the image actually recorded, the heat diffusion in the edge portion makes it possible to express edges clearly without any false edges, as seen FIG. 3*d*.

$$D = \begin{cases} D_m (D > D_m) \\ D(kE_0 \leqq D \leqq D_m) \\ kE_0 (D < kE_0) \end{cases}$$

This conversion is applied to all image data. $D_m$ denotes the possible maximum value of the image data, and may be appropriately determined.

k is preferably 0.5 to 0.9, more preferably 0.6 to 0.7. k is however in no way limitative, and can be appropriately determined depending on the performance of the thermal head used and the properties of the thermal recording materials. The false edge can not be completely removed at a value k less than 0.5, and sufficiently high quality images can not be obtained in some cases because of the lack of satisfied improvement in sharpness at a value k more than 0.9. Thus, these values are not preferred.

As described above, according to this embodiment, it is preferred that tone correction is followed by sharpness correction which, in turn, is followed by false edge reducing treatment which, in turn, is followed by shading correction, correction of resistance values or calculation treatment of representative values of image data for compensation for temperature elevation.

The order of performing shading correction and the correction of resistance values is by no means fixed and either may precede the other; however, if the result of correction depends on the image data, namely, the image density, the correction which has the greater dependency on image density is preferably performed first. As already mentioned, the shading correction and the correction of resistance values are of such types of correction that the image data are multiplied by the correction coefficients (i.e., data for the shading correction and data for the correction of resistance values) that have been determined for each pixel (i.e., for each heat-generating element) and, therefore, the effect of density on the result of correction can be reduced by first performing the correction which has the greater density dependency. In general, the shading correction is more density-dependent than the correction of resistance values and, hence, the former is generally performed earlier than the latter.

If the two corrections are equivalent in density dependency, either may precede the other. In addition, as already mentioned, the two corrections involve the multiplication of the correction data by coefficients of corrections and, hence, they may be performed simultaneously (preferably in the case where they are equivalent in density dependency).

Speaking of the data for shading correction and the data for correction of resistance values, both are inherent in the thermal head 66, so in a preferred embodiment, relevant data for corrections are preliminarily constructed in association with the thermal head 66 and upon each replacement of the thermal head 66, the data are entered (loaded) into the recording apparatus 10 (data storage unit 86) with the aid of an external memory device such as an IC card or a FD.

Either one of the black ratio correction and the load variation correction may precede the other The correction order can be appropriately determined depending on the combination of the thermal material A with the recording apparatus 10. Therefore, for a given combination of the thermal material A with the recording apparatus 10, at least two times of the test printing (test recording) in the normal and reversed orders of these correction are actually performed, then the order giving better thermal recording can be applied.

As described above, the compensation of temperature elevation must be performed at the last stage, because the actual correction amount is larger. This correction is performed by dividing the image data into regions (blocks) having a given size, and calculating for the prediction of the temperatures of the respective blocks. To do this, the quantities of the heat generated in the respective blocks are calculated by means of the calculation treatment of representative values of image data. The values obtained must represent precisely the quantities of the heat generated in the respective blocks. Therefore, the calculation treatment of representative values of image data must be performed after the tone correction, and preferably precedes the correction of resistance values, the black ratio correction and the load variation correction. The calculation treatment of representative values of image data may be performed before or after the sharpness correction, or before or after the shading correction. The correction order can be appropriately determined after the corrected image data were actually subjected to test printing.

In the case where the image to be thermally recorded does not require high quality, it is also possible to perform the calculation treatment of representative values of image data in any stage after the tone correction, even if it is not before the correction of resistance values, the black ratio correction, or the load variation correction. The predicted precision would be however somewhat deteriorated.

However, as will be apparent from the foregoing explanation, the black ratio correction, the load variation correction and the compensation for temperature elevation involve a huge amount of calculations and, depending on the computing capacity of the image processing unit 80 and the timing of processing (e.g. in the case that not all of the calculations for correction are completed before the start of thermal recording but the recording is performed in parallel with the calculations), it is difficult to perform the black ratio correction and the load variation correction before the compensation for temperature elevation which has a large amount of correction and is required to perform at the last stage.

In fact, the black ratio correction and the load variation correction involve a comparatively small amount of correction of the image data and, particularly in the case where the power supply to the thermal head 66 has a large capacity (namely, it has a small internal resistance), the voltage variation due to black ratio is small, and the torque variation of the transport motor, that is the load variation is also small, depending on the types and the sizes of the thermal materials A, and the pressure of the thermal head 66 on the thermal material A. The amount of black ratio correction and load variation correction that are performed on the image data is thus reduced to an extremely small level.

Therefore, at least one of the black ratio correction and the load variation correction can be omitted according to the image quality level required.

Thus, according to the thermal recording apparatus 10 of the invention in which sharpness correction and tone correction are followed by shading correction and correction of resistance values which, in turn, are followed by compensation of temperature elevation, and calculation treatment of representative values of image data for compensation of temperature elevation is performed either prior to or after either one of the image processing jobs subsequent to tone correction, and if necessary, black ratio correction and/or load variation correction are performed between shading correction and correction of resistance values on the one hand, and compensation of temperature elevation on the other hand, all kinds of corrections are performed properly, and intended effects can be fully obtained. So, high quality thermal images can be recorded consistently on the basis of the appropriately image processed data for thermal recording.

As described above, image data from an image data supply source R such as CT or MRI are supplied to the image processing unit 80 of the recording apparatus 10. The image processing unit 80 sends the image data to the data storage unit 86 where the image data subjected to an optional formatting are stored.

When the image data are stored in the data storage unit 86, first of all, the image processing unit 80 reads out necessary data from the data storage unit 86. Prior to the start of the thermal recording, subjects all of the image data stored and read out in the data storage unit 86 to sharpness correction which is followed by tone correction. Alternatively, the image processing unit 80 subjects all of the read-out image data to tone correction which is followed by sharpness correction which, in turn, is followed by the false edge reducing treatment in order to reduce significantly the white false edge portions caused by the sharpness correction (enhancement), and to express clearly the edges in the image to be recorded. Then, the processed image data are restored in the data storage unit 86.

After the end of these corrections, thermal image recording is started. The image processing unit 80 reads out necessary data from the data storage unit 86. Of the image data stored in the data storage unit 86, the image data of the first line where the image recording is to be first performed are subjected to the first processing. Then, the subsequent image data are successively subjected to the corrections line by line in the order of image recording. Shading correction, correction of resistance values, and as required, black ratio correction and load variation correction, and finally compensation of temperature elevation are performed, whereby data for the image to be thermally recorded by means of the thermal head 66 are obtained. It is noted that calculation treatment of representative values of image data for compensation of temperature elevation can be performed after tone correction, at any stage before or after the start of recording.

The recording control unit 84 reads out successively the thermal recording image data for which all necessary corrections were performed, line by line from the data storage unit 86. The control unit 84 then supplies the thermal head 66 with a recording signal representing each of the thusly read image data (and represented by the duration of time for which voltage is applied imagewise).

The individual heat-generating elements on the thermal head 66 generate heat in accordance with the received recording signal and, as already described above, thermal image recording is performed on the thermal material A as it is transported in the direction of arrow b by such means of transport as the platen roller 60.

If the above-stated requirements of the order of corrections are satisfied, the recording apparatus 10 of the invention may be adapted such that after all image data for thermal recording that have been subjected to all necessary corrections are stored in the data storage unit 86 (namely, after the data on the images to be recorded have been constructed), data are read line by line from the data storage unit 86 to thereby start the process of image recording.

However, the recording time can be reduced significantly by adopting the design described in the preceding paragraphs, namely, the design in which the sharpness correction and the tone correction are performed before the start of recording and, thereafter, the calculations necessary for the other corrections are performed concurrently with the progress of recording.

After the end of thermal image recording, the thermal material A as it is guided by the guide 62 is transported by the platen roller 60 and a transport roller pair 63 to be ejected into a tray 72 in the ejecting section 22. The tray 72 projects exterior to the recording apparatus 10 via the outlet 74 formed in the housing 28 and the thermal material A carrying the recorded image is ejected via the outlet 74 for takeout by the operator.

On the foregoing pages, the thermal recording method and the thermal recording apparatus of the invention has been described in detail but the present invention is in no way limited to the stated embodiments and various improvements and modifications can of course be made without departing from the spirit and scope of the invention.

As described above in detail, the present invention ensures that the intended results can fully be attained in all kinds of image processing (correction) jobs that are performed in thermal recording with a thermal head and, hence, images of high quality can be recorded consistently on the basis of the appropriately image processed data for thermal recording.

What is claimed is:

1. A thermal recording method comprising the steps of:

supplying image data from an image data supply source;

subjecting said image data to specified image processing jobs thereby producing processed image data, wherein said image processing jobs include sharpness correction, tone correction, shading correction, correction of resistance values, compensation for temperature elevation, and calculation treatment of representative values of the image data for compensation for temperature elevation, said processing jobs being performed in a specified order such that said sharpness correction and said tone correction are followed by said shading correction and said correction of resistance values which, in turn are followed by said compensation for temperature elevation, provided that said calculation treatment of representative values of the image data for said compensation for temperature elevation is performed either one of prior to and after either one of the shading correction and the correction of resistance values that are performed subsequent to the tone correction; and driving a thermal head in accordance with the processed image data so as to perform thermal recording.

2. A thermal recording method according to claim 1, wherein said image processing jobs further include black ratio correction and load variation correction which are performed after said shading correction and said correction of resistance values, and prior to said compensation for temperature elevation.

3. A thermal recording method according to claim 2, wherein said processing job of sharpness correction is followed by said processing job of tone correction.

4. A thermal recording method according to claim 2, wherein said processing job of tone correction is followed by said processing job of sharpness correction.

5. A thermal recording method according to claim 1, wherein said processing job of sharpness correction is followed by said processing job of tone correction.

6. A thermal recording method according to claim 1, wherein said processing job of tone correction is followed by said processing job of sharpness correction.

7. A thermal recording method according to claim 1, wherein said specified image processing jobs further include black ratio correction or load variation correction which are performed after said shading correction and said correction of resistance values, and prior to said compensation for temperature elevation.

8. A thermal recording method according to any one of claims 1–7, wherein said shading correction and said correction of resistance values processing jobs are dependent upon image density, said method further comprising the steps of:

determining if one of shading correction and correction of resistance values is more dependent upon image density;

wherein, if one of shading correction and correction of resistance values is more dependent upon image density than the other, then said method includes performing first the one of said shading correction and said correction of resistance value which is more dependent upon image density; and wherein, if neither of said shading correction and said correction of resistance values is more dependent upon image density than the other then said method includes performing simultaneously said shading correction and said correction of resistance values.

9. A thermal recording method according to claim 8, wherein said method includes performing said load variation correction following said black ratio correction.

10. A thermal recording method according to any one of claims 2–7, wherein said method includes performing said load variation correction following said black ratio correction.

11. A thermal recording apparatus comprising:

a thermal head having a glaze with a unidirectional array of heat-generating elements;

means for relatively moving a thermal recording material to the thermal head in the direction perpendicular to the direction in which said heat-generating elements are arranged, with said glaze being in contact with the thermal recording material;

image processing means for performing image processing jobs on image data supplied from an image data supply source such that the image data is subjected to sharpness correction and tone correction which are followed by shading correction and correction of resistance values which, in turn, are followed by compensation for temperature elevation, provided that calculation treatment of representative values of the image data for said compensation for temperature correction is performed either one of prior to and after either one of the shading correction and the correction of resistance values that are performed subsequent to the tone correction; and recording control means for driving said thermal head on the basis of the image data that have been processed by said image processing means.

12. A thermal recording apparatus according to claim 11, wherein said image processing means further performs black ratio correction and load variation correction after said shading correction and said correction of resistance values, and prior to said compensation for temperature elevation.

13. A thermal recording apparatus according to claim 12, wherein said image processing means is configured to perform said tone correction after said sharpness correction.

14. A thermal recording apparatus according to claim 12, wherein said image processing means is configured to perform said sharpness correction after said tone correction.

15. A thermal recording apparatus according to claim 11, wherein said image processing means is configured to perform said tone correction after said sharpness correction.

16. A thermal recording apparatus according to claim 11, wherein said image processing means is configured to perform said sharpness correction after said tone correction.

17. A thermal recording apparatus according to claim 11, wherein said image processing means further performs black ratio correction or load variation correction after said shading correction and said correction of resistance values, and prior to said compensation for temperature elevation.

18. A thermal recording apparatus according to any one of claims 11–17, wherein said shading correction and said correction of resistance values processing jobs dependent upon image density, and said image processing means is further configured for:

determining if one of shading correction and correction of resistance values is more dependent upon image density;

performing first the one of said shading correction and said correction of resistance value which is more dependent upon image density, if one of shading correction and correction of resistance values is more dependent upon image density than the other; and for performing simultaneously said shading correction and said correction of resistance values, if neither of said shading correction and said correction of resistance values is more dependent upon image density than the other.

19. A thermal recording apparatus according to claim 18, wherein said image processing means is configured to perform said black ratio correction before said load variation correction.

20. A thermal recording apparatus according to any one of claims 12–17, wherein said image processing means is configured to perform said black ratio correction before said load variation correction.

* * * * *